UNITED STATES PATENT OFFICE.

JOHN F. COLLINS, OF NEW HAVEN, CONNECTICUT, ASSIGNOR OF ONE-HALF HIS RIGHT TO WILLIAM J. GOULDING, OF PROVIDENCE, RHODE ISLAND.

IMPROVEMENT IN COMPOUNDS FOR SEPARATING WOOL FROM RAGS.

Specification forming part of Letters Patent No. 151,476, dated June 2, 1874; application filed May 19, 1874.

*To all whom it may concern:*

Be it known that I, JOHN F. COLLINS, of New Haven, in the State of Connecticut, have invented a certain new and useful Fluid Compound for Destroying the Cotton in Fibrous Materials made of Cotton and Wool; and I do hereby declare that the following specification is a full, clear, and exact description thereof.

The object of my invention is to destroy and remove the cotton from rags composed of cotton and wool by the use of a certain composition, hereinafter described, without destroying the animal matter in the wool, or otherwise rendering it unfit for subsequent use.

For this purpose I provide a solution of the following ingredients, and in the following proportions, which may, however, be somewhat varied with a good result: To ten gallons of water I put three pounds of alum, two pounds of borax, five pounds nitrate of soda, and from three to six pounds of muriatic acid. This solution I heat to a temperature between 170° and the boiling-point, and immerse the rags therein from five to twenty minutes, as may be necessary, when they are taken out, thrown into cold water, and thoroughly rinsed. It will then be found that the action of the acid upon the cotton has destroyed the fiber, so that in rinsing it is removed and separated from the wool. The rags being removed from the solution as soon as the fiber of the cotton is destroyed, the condition of the wool will not be materially changed, or the animal matter affected.

While the acid acts upon the cotton fiber with such destructive effect, it will not act upon the wool to any considerable degree, if not allowed to remain in the solution too long, the wool being protected from the extreme action of the acid by the alum, the borax purifying the composition.

With the solution before mentioned some difficulties are experienced in working large quantities of rags, for the reason that the acid has a tendency to rise to the top, and also that the action of the acid may be prolonged on account of the time necessarily employed in removing a large quantity from the solution. In such cases I use a small quantity of charcoal in place of the alum, say one-half a pound, which frees the acid, and assists the mixture of the ingredients, and in place of the soda a small quantity of Peruvian guano, say one-half a pound, which softens the wool, and prevents it from becoming hard and brittle through the action of the other ingredients.

What I claim as my invention, and desire to secure by Letters Patent, is—

1. The solution composed of water, alum, borax, soda, and muriatic acid, in the proportions substantially as described, for the purposes specified.

2. The solution composed of water, charcoal, borax, Peruvian guano, and muriatic acid, in the proportions substantially as described, for the purposes specified.

JOHN F. COLLINS.

Witnesses:
WALTER B. VINCENT,
J. T. RICH.